(12) United States Patent
Spangler (10) Patent No.: US 7,130,463 B1
(45) Date of Patent: Oct. 31, 2006

(54) ZOOMED HISTOGRAM DISPLAY FOR A DIGITAL CAMERA

(75) Inventor: Randall R. Spangler, San Jose, CA (US)

(73) Assignee: Foveon, Inc., Santa Clara, CA (US)

( * ) Notice: Subject to any disclaimer, the term of this patent is extended or adjusted under 35 U.S.C. 154(b) by 737 days.

(21) Appl. No.: 10/310,601

(22) Filed: Dec. 4, 2002

(51) Int. Cl.
*G06K 9/00* (2006.01)

(52) U.S. Cl. .................. 382/168; 382/214; 382/312

(58) Field of Classification Search ............ 382/128, 382/134, 274, 118, 164, 165; 348/65, 74, 348/620, 337, 374; 600/109, 118, 129
See application file for complete search history.

(56) References Cited

U.S. PATENT DOCUMENTS

| | | | | |
|---|---|---|---|---|
| 4,462,024 | A | * | 7/1984 | Strolle ................... 345/657 |
| 5,487,172 | A | * | 1/1996 | Hyatt ..................... 712/32 |
| 6,546,123 | B1 | * | 4/2003 | McLaren et al. .......... 382/128 |
| 6,677,959 | B1 | * | 1/2004 | James ..................... 345/660 |
| 6,700,685 | B1 | * | 3/2004 | Matama ................... 358/487 |
| 6,791,601 | B1 | * | 9/2004 | Chang et al. .............. 348/65 |

FOREIGN PATENT DOCUMENTS

| JP | 401243182 A | * | 9/1989 |
|---|---|---|---|
| JP | 404048232 A | * | 2/1992 |

OTHER PUBLICATIONS

Spaulding, Kevin E., et al., "Reference Input/Output Medium Metric RGB Coloer Encodings (RIMM/ROMM RGB)," PICS 2000 Conference, Mar. 26-29, 2000, Portland, Oregon.

Author Unknown, "A New Approach to Dynamic Range," Digital Photography Review, Sep. 7, 2000, available at: http://www.dpreview.com/news/0009/00090702columbiadynrange.asp.

Author Unknown, "PMA 2002 Show Report," Digital Photography Review, Feb. 2002, available at: http://www.dpreview.com/articles/pma2002/page7.asp.

Tompkins, Michael R., "Sigma SD9: Sample Photos and Comparisons!" The Imaging Resource, Sep. 26, 2002, available at: http://www.imaging-resource.com/EVENTS/PKNA02/1033071640.html.

Narasimhan, Srinivasa G., "Untitled Synopsis," Oct. 4, 2002, available at: http://www.cs.columbia.edu/~srinivas/body.html.

Adobe Systems, Inc., "Checking Scan Quality and Tonal Range (Photoshop)," Adobe Photoshop 7.0 Online-Help, 2002, Chapter 8, Section 2.

* cited by examiner

*Primary Examiner*—Anh Hong Do
(74) *Attorney, Agent, or Firm*—Sierra Patent Group, Ltd.

(57) ABSTRACT

An apparatus and a method are provided to allow a portion of a captured image to be evaluated with a digital camera. A display device of the digital camera can display the captured image. A specific area of interest of the captured image can be defined on the display device by zooming and panning or by defining a window over the captured image, and a histogram derived from only that area of interest can be displayed. The histogram can represent different types of information about the pixels of the captured image within the area of interest such as the levels of individual colors and luminance.

18 Claims, 5 Drawing Sheets

ZOOMED HISTOGRAM DISPLAY FOR A DIGITAL CAMERA

BACKGROUND OF THE INVENTION

1. Field of the Invention

The present invention relates generally to the field of photography and more specifically to a method and apparatus for analyzing captured digital images.

2. Description of the Prior Art

Figure 1:
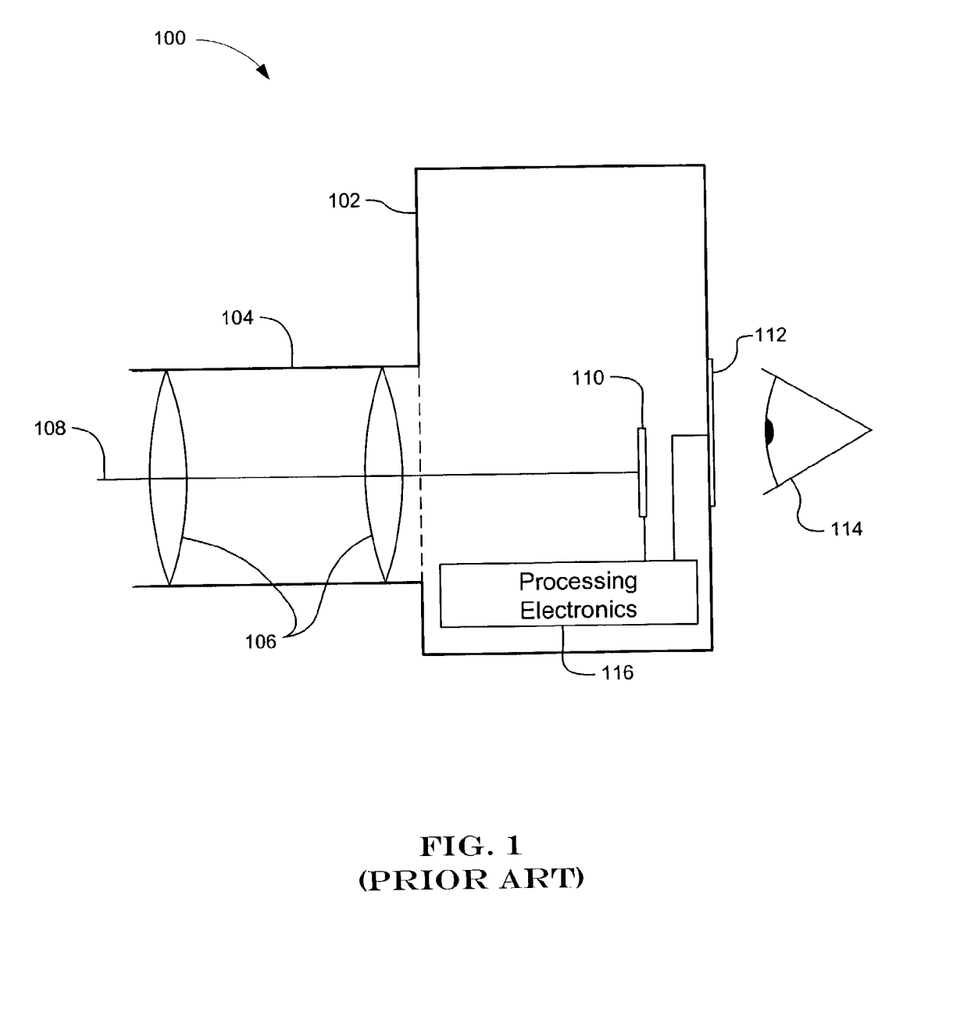
FIG. 1 is a cross-sectional view of a digital camera according to the prior art.

FIG. 1 provides a cross-section of a digital Single Lens Reflex (SLR) camera 100 of the prior art. The digital SLR camera 100 includes a housing 102 and a lens system 104 that in most designs is removable. The lens system 104 includes focusing optics 106 that direct incoming light along an optical axis 108. A sensor 110 intersects, and is typically centered on, the optical axis 108 opposite the lens system 104 along a focal plane thereof.

The sensor 110 typically consists of an array of photo-sensitive pixel sensors that are each capable of converting incident light into an electric signal. Image capturing electronics create a digital image by digitizing the electric signals from each of the pixel sensors of the sensor 110, processing the digitized data, and storing the resulting processed data to a memory device (not shown) such as a Random Access Memory (RAM) or a magnetic disk. The digital image is typically stored as an array of pixels, where each pixel includes color and brightness information for a particular location in the digital image.

Commonly, camera 100 includes a display device 112, such as a liquid crystal display (LCD), to allow a user 114 to review captured digital images. Processing electronics 116 are provided to process captured digital images in order to generate the displayed images shown on the display device 112. Although the captured digital images are typically of a high resolution, the displayed images tend to be of a lower resolution. The difference in resolution can be caused by several factors. For example, the number of pixels in the display device 112 devoted to displaying an image is typically far fewer than the number of pixels of the full digital image. Additionally, a pixel in a display device 112 is typically unable to display as many gradations in brightness as can be represented by a pixel in the captured image. Accordingly, it can be difficult for a user 114 to judge the quality of a captured digital image from a displayed image as viewed on the display device 112.

Accordingly, what is needed is an apparatus and method that will allow a user of a digital camera to evaluate a captured digital image to determine whether the digital image is satisfactory or whether the digital image should be retaken, for example, with a different exposure setting.

SUMMARY

The present invention provides both an apparatus and a method for allowing a user of a digital camera to evaluate portions of a captured image to determine, for example, whether to retake the image with a different exposure setting. The apparatus of the invention is a digital camera provided with a display device, a user interface, and processing electronics. The display device is configured to display a captured image, and the user interface allows the user to select a reduced portion of the captured image, for example, with controls that enable the captured image to be zoomed and panned on the display device. The processing electronics are configured to derive a histogram of the reduced portion, and can also be configured to provide the histogram to the display device.

The histogram is a graphical representation of a distribution of values for those pixels of the captured image that are within the reduced portion. The values are discrete numbers within fixed ranges for either stored or derived image values. A stored image value, such as a level of a color channel, is one that is stored for each pixel of the stored digital image. A derived image value is not stored for each pixel but is instead calculated from one or more stored image values. One such derived image value is luminance which is a weighted combination of color channels. In some embodiments the histogram includes values from more than one image value, for example, a histogram with a line for each of three color channels.

The invention also includes a method for providing a histogram display on a digital camera. The method includes displaying a captured image as a displayed image on a display device of the digital camera, where the captured image includes a first number of stored pixels. The method also includes selecting a reduced portion of the captured image, where the reduced portion includes a second number of stored pixels less than the first number of stored pixels. Additionally, the method includes deriving a histogram from the second number of stored pixels and displaying the histogram.

Selecting the reduced portion can include, for example, zooming the displayed image on the display device or defining a reduced window on the displayed image. In those embodiments where selecting the reduced portion includes defining a reduced window on the displayed image, the reduced window can be rectangular, circular, or have a shape defined by the user. In some embodiments more than one reduced window can be defined on the displayed image to select the reduced portion. Displaying the histogram can include showing the histogram adjacent to the displayed image, overlaid over the displayed image, or in place of the displayed image.

The invention also includes a method for providing a zoomed histogram display on a digital camera. This method includes displaying a digital image on a display device of the digital camera, and zooming the digital image until only an area of interest of the digital image is displayed. The method also includes deriving a histogram based on the area of interest and displaying the histogram. Displaying the digital image can include reading a stored digital image from a memory device. The stored digital image can include a first number of stored pixels that are mapped to displayed pixels of the display device. Zooming the digital image includes mapping a second number of stored pixels of the stored digital image to the displayed pixels, where the second number of stored pixels is less than the first number of stored pixels.

Each stored pixel of the second number of stored pixels includes a value within a range for a stored image value. The histogram can be derived by dividing the range into a number of bins and counting stored pixels for each bin. Here, each bin represents a part of the range, so the stored pixels counted for each bin are those having values for the stored image value within the part of the range represented by that bin. In those embodiments where each stored pixel includes more than one stored image value, such as one image value for each of three color channels, the range for each color channel can be divided into a number of bins and the stored pixels of the second number of stored pixels can be counted for each bin of each range. In some embodiments deriving the histogram can include calculating a luminance value for each stored pixel of the second number of stored pixels by calculating a weighted combination of the values of the three color channels. For each stored pixel this calculation will determine a derived value within a derived range. The derived range can be divided into a number of bins as described above, and the derived values for the stored pixels in the second number of pixels can be counted for each of these bins.

The invention further includes a method for evaluating a captured image stored on a digital camera. This method includes displaying the captured image on a display device of the digital camera, and selecting an area of interest from the captured image, where the area of interest is less than an entire area of the captured image. The method also includes displaying a histogram derived from the area of interest and evaluating the histogram. To better evaluate the histogram the histogram can be rescaled on the display device to show only a segment thereof. In particular, this can allow the user to view only a segment of a range of an image value, such as the ends of the range that show the numbers of pixels that are either under exposed or over exposed for the particular image value. Based on the evaluation of the histogram, a user can determine whether the captured image is acceptable. If the captured image is not acceptable, the user in some cases can attempt to acquire a more acceptable one.

DETAILED DESCRIPTION OF THE INVENTION

The present invention provides an apparatus and a method for allowing a user of a digital camera to evaluate parts of a captured image. The ability to evaluate parts of the captured image can allow the user to determine, for example, whether to continue to save the captured image or whether to retake it with a different exposure time. More specifically, the invention provides a digital camera with a display device, such as an LCD, that can display the captured image as a displayed image and display a histogram derived from a reduced portion of the captured image. The invention allows the user to define a specific area of interest of the displayed image through the use of a user interface. Processing electronics within the digital camera derive the histogram from only those pixels in the reduced portion of the captured image that correspond to the area of interest in the displayed image. The processing electronics can then display the histogram on the display device. The histogram can represent different types of information about the area of interest such as the levels of individual color channels or of the luminance.

Figure 2:
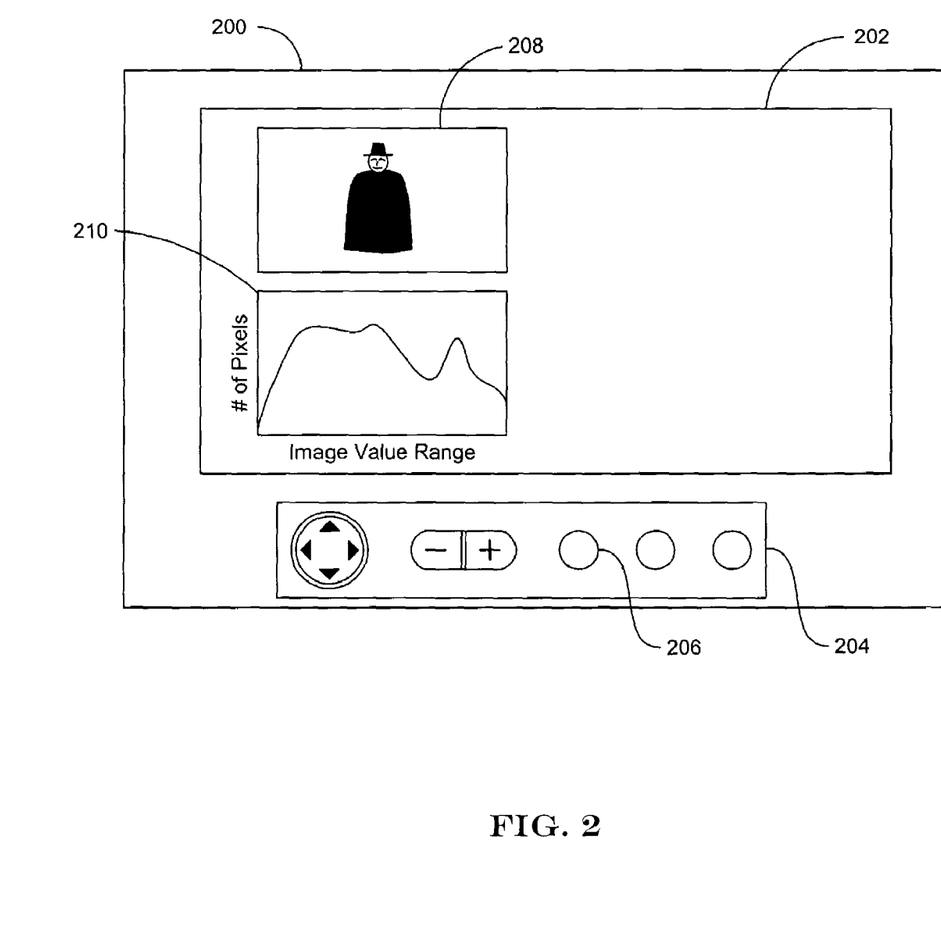
FIG. 2 is a view of a display portion of a digital camera according to an embodiment of the invention.

FIG. 2 is a view of a display portion of a digital camera 200 of the invention, where the display portion is preferably opposite a front side that can include a lens system. The digital camera 200 includes a display device 202 and a user interface 204. Although shown in FIG. 2 as adjacent one another in a display portion of the digital camera 200, it will be appreciated that the display device 202 and the user interface 204 can be located separately and need not be opposite the lens system. The user interface 204 includes controls, such as buttons 206, that allow the display device 202 to be used in various ways. For example, in some embodiments the user interface 204 can be used to toggle the digital camera 200 between a viewfinder mode and an image review mode. In the viewfinder mode the display device 202 is configured to show a real-time image of any illumination being received through the lens system. In the image review mode the display device 202 is configured to display captured images such as those stored in a memory device of the digital camera 200. The memory device can be non-volatile and either internal to the digital camera 200 or externally attached. In some embodiments the image review mode can also be used to review a captured image stored in a volatile memory device such as a buffer used to temporarily cache the captured image.

When the digital camera 200 is in the image review mode, the user interface 204 allows the user to perform various activities interactively with the display device 202. These activities include displaying menus on the display device 202, navigating through the menus, and selecting options presented by the menus. Activities can also include viewing a plurality of captured images as side-by-side or tiled thumbnail images in a small image format and selecting a captured image to view in a larger image format on the display device 202, such as displayed image 208. Another activity available through the user interface 204 is to select and delete captured images that are not desired to be retained.

The option to view the displayed image 208 in a larger image format allows the user to better evaluate the captured image than when viewed as a thumbnail. In one larger image format the displayed image 208 fills the entire area of the display device 202. As shown in FIG. 2, other larger formats display the displayed image 208 in a window that is larger than the size of a thumbnail image yet smaller than the entire area of the display device 202. Some embodiments allow the user to toggle between several image formats through the use of the user interface 204.

Despite the availability of larger image formats, it will be appreciated that sometimes it can be difficult for a user to judge the quality of a captured image from the displayed image 208 due to resolution limitations of the display device 202, as discussed above in the Description of the Prior Art. For example, if the displayed image 208 in FIG. 2 corresponds to a captured image that was acquired with an autoexposure mechanism that looked to the center of the image to set the exposure time, the exposure time would be lengthy since the center of the captured image is predominantly black. Thus, other areas of the captured image, such as the face, may be badly overexposed. Yet, even when viewed in a larger image format on the display device 202, the overexposure might not be apparent to the user. Accordingly, it is often useful to have other means for evaluating the captured image.

When the displayed image 208 is displayed in a window, as shown in FIG. 2, the display device 202 can also be used to display related image information adjacent to or within the window. Image information can include, for instance, identifying indicia, exposure time, and resolution of the captured image. Image information can also include statistical information derived from the captured image such as a histogram 210. A histogram 210 is a graphical representation of a distribution of image values for pixels of the captured image. The image values can represent a level of a grayscale in black and white photography, while in color photography image values can be, for example, a level of a color channel or of the luminance of the several color channels. Luminance is a weighted combination of color channels meant to approximate brightness, the subjective attribute of light as perceived by the human eye. Accordingly, the color channels are weighted to account for the differences in the eye's sensitivity to light of different colors and intensities.

More specifically, an image value for any particular pixel is a discrete value within some fixed range. The range is typically a power of two, such as 256 or 512, though the range can be any number. Accordingly, a histogram 210 is typically arranged such that a X-axis represents the range of an image value while the Y-axis represents numbers of pixels. As an example, in a well exposed captured image there will be some pixels with a luminance near the bottom of a range and some pixels with a luminance near the top of the range, while the majority of the pixels will have luminances distributed throughout the middle of the range. The histogram 210 in FIG. 2 illustrates such a distribution.

Figure 3:
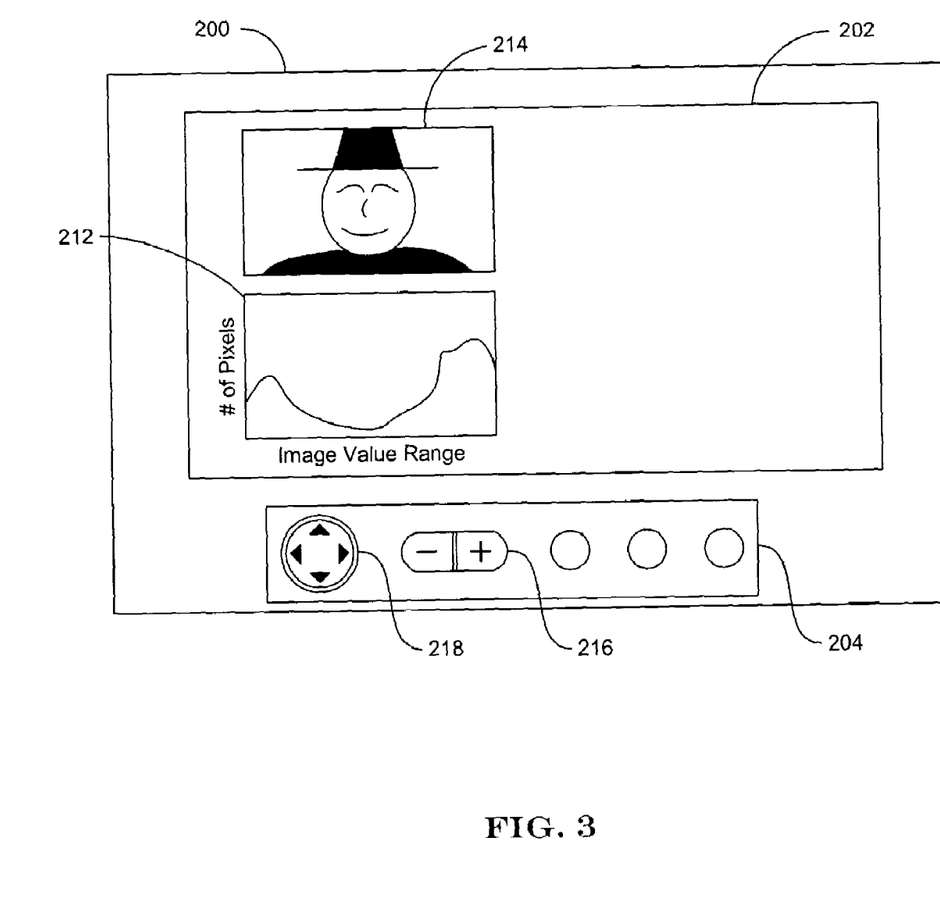
FIG. 3 is a view of a display portion of a digital camera according to another embodiment of the invention.

According to the present invention, as shown in FIG. 3, a histogram 212 is derived from a reduced portion of the captured image that the user can select with the user interface 204. One method for selecting the reduced portion is to pan and zoom the displayed image 208 until only an area of interest 214 of the displayed image 208 is displayed. Panning and zooming can be achieved, for example, with a zoom rocker 216 to zoom and a joystick 218 to pan.

It should be noted at this point that a captured image, as stored, is made up of a first number of pixels that is often on the order of millions of pixels ("megapixels") whereas the number of pixels in the entire area of the display device 202 is typically far fewer. The pixels of the captured image and of the displayed image 208 will be referred to as stored pixels and displayed pixels, respectively. Accordingly, to display the captured image on the display device 202 requires mapping many stored pixels to each displayed pixel. The mapping can be achieved, for example, by taking an average of image values of many stored pixels to create a set of image values for the displayed pixel.

In view of the above, it will be appreciated that when the displayed image 208 is zoomed to the area of interest 214 those stored pixels outside of the area of interest 214 are no longer mapped to displayed pixels, and also that the number of stored pixels mapped to each displayed pixel decreases. Zooming is therefore sometimes thought of as changing a magnification of the displayed image 208 since it has the effect of making features in the displayed image 208 appear larger on the display device 202. For example, the features in the area of interest 214 appear several times larger in FIG. 3 than they do in the displayed image 208 in FIG. 2.

By contrast, panning does not change the number of stored pixels mapped to each displayed pixel. Instead, panning changes which stored pixels are mapped to each displayed pixel. Accordingly, panning has the effect of changing which stored pixels are mapped to the area of interest 214 and which are excluded. Panning therefore produces the visual effect of moving through or across the displayed image 208 at the particular magnification already set by the zoom.

Figure 4:
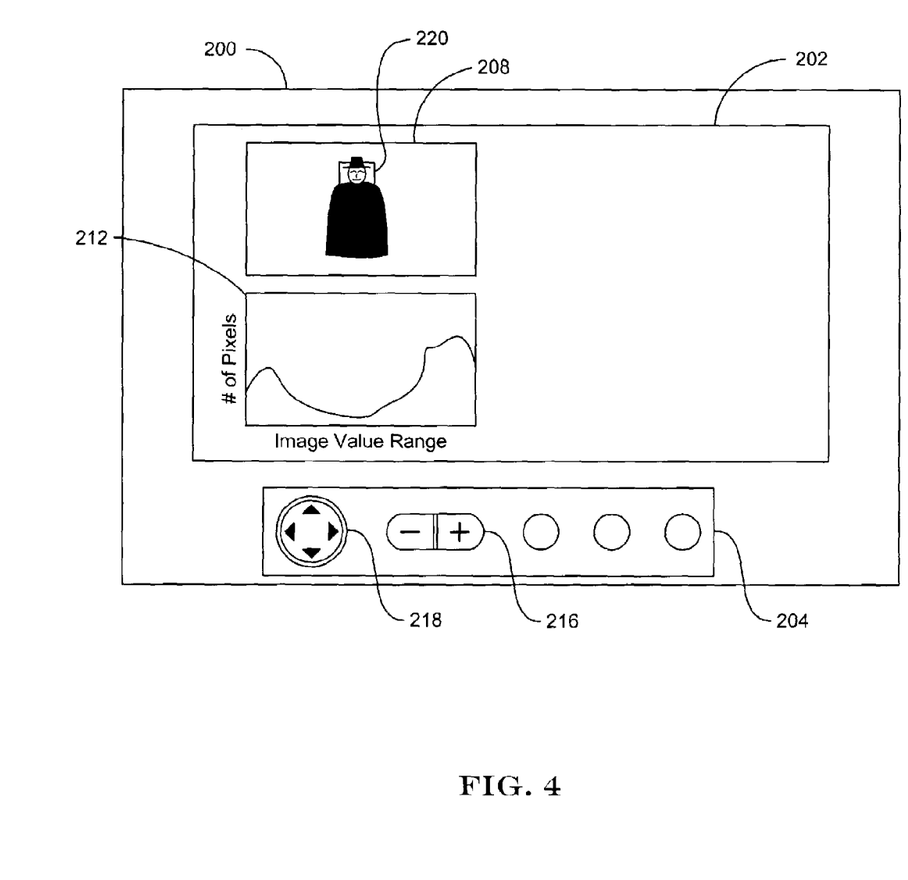
FIG. 4 is a view of a display portion of a digital camera according to another embodiment of the invention.

According to the invention, histogram 212 is derived from the stored pixels within a reduced portion of the captured image, such as the stored pixels that are mapped to the displayed pixels of the area of interest 214, as will be described in greater detail with respect to FIG. 5. It will be appreciated that in addition to panning and zooming there are other methods for a user to select the reduced portion of the captured image. For example, in some embodiments the user interface 204 is used to define a reduced window 220 on the displayed image 208 as shown in FIG. 4. In some of these embodiments the zoom rocker 216 can be used in conjunction with the joystick 218 to select a size for the reduced window 220 and to position the reduced window 220 within the displayed image 208 over some area of interest. In these embodiments the histogram 212 is derived from the stored pixels that map to the displayed pixels within the reduced window 220.

In some embodiments, histogram 212 is derived from values assigned to the displayed pixels within the reduced window 220 or the area of interest 214 (FIG. 3). The values assigned to the displayed pixels are derived from the image values of the stored pixels that map to the displayed pixels, for example, by averaging over small groups of the stored pixels. Thus, in these embodiments the histogram 212 represents a distribution of values derived from the image values of the stored pixels rather than a distribution of the image values of the stored pixels themselves.

The reduced window 220 in FIG. 4 is not limited to rectangular shapes. In some embodiments the reduced window 220 can be circular and in some of these embodiments the user interface 204 can be used to select a center point and a radius of the circular reduced window 220. In still other embodiments the user can employ the user interface 204 to draw a free-hand reduced window 220 on the displayed image 208. In yet other embodiments more than one reduced window 220 can be defined over the displayed image 208. In these embodiments the several reduced windows 220 are considered together to determine the histogram 212. Further, it will be understood that the zoom rocker 216 and the joystick 218 are exemplary controls for the user interface 204, but that the invention is not limited to these particular control devices. In some embodiments, for example, the display device 202 is touch sensitive and the user interface 204 allows the user to define the reduced window 220 on the displayed image 208 by touching the screen, for example, with a stylus or a finger.

Figure 5:
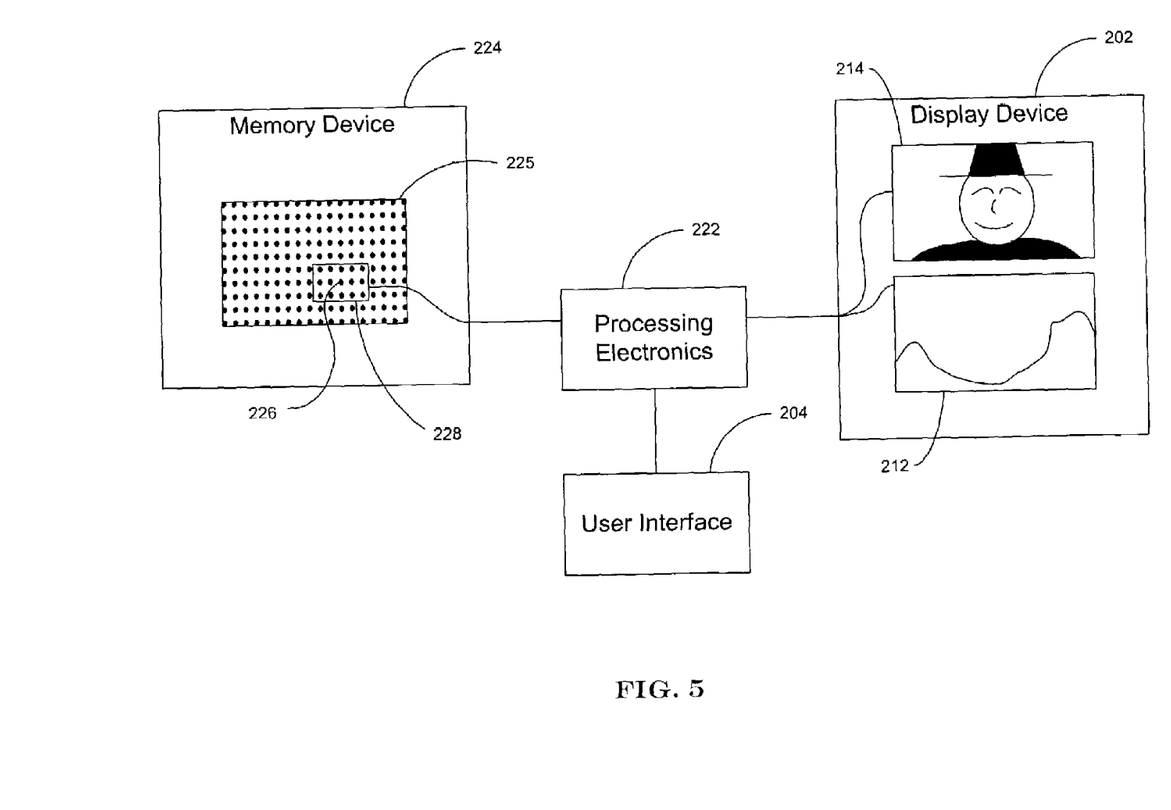
FIG. 5 is a schematic diagram of components of a digital camera according to an embodiment of the invention.

FIG. 5 is a schematic diagram showing processing electronics 222 configured to respond to commands from the user interface 204 in order to create a display on the display device 202 such as from data stored in a memory device 224. The memory device 224 is configured to store a captured image 225 including a first number of the stored pixels 226. As noted above, the user interface 204 is configured to allow the user to select an area of interest 214 on the display device 202. The processing electronics 222 are configured to identify a second number of the stored pixels 226 in a reduced portion 228 of the captured image 225 that are mapped to the displayed pixels within the area of interest 214.

The processing electronics 222 are also configured to derive the histogram 212 from the second number of stored pixels 226 in the reduced portion 228 and to display the histogram 212 on the display device 202. The histogram 212 can represent stored image values, such as the levels of individual color channels. In some embodiments the individual color channels are the primary colors typically used in imaging devices, namely red, green, and blue, though any combination of colors can be used. The histogram 212 can also represent derived image values, such as luminance which is calculated from the stored image values. Another derived image value can be a value for a displayed pixel within the area of interest 214, where the value is derived from one or more stored image values, as described above.

As noted above, image value information is digitized into discrete values within a fixed range so that, for example, a stored pixel 226 will include one of 256 possible values for the red color channel, another of 256 possible values for the blue color channel, and so forth. In some embodiments the processing electronics 222 derive the histogram 212 by first dividing the range for a particular image value into a number of bins, where each bin represents a part of the range. In some embodiments each of the discrete values in the range is assigned a separate bin, while in other embodiments two or more consecutive values are assigned to each bin. Next, the processing electronics 222 counts the number of stored pixels 226 within the part of the range assigned to each bin. Accordingly, a number of stored pixels 226 are determined for each bin, and a sum of the number of stored pixels in all of the bins equals the second number of stored pixels 226 in the reduced portion 228.

It will be appreciated that the processing electronics 222 can count the number of stored pixels 226 for each bin within a range for more than one image value so that more than one image value is represented in the histogram 212. In some embodiments three image values, namely each of the three primary color channels, are each represented as a separate line in the histogram 212 such that the line representing the red color channel is itself red in the histogram 212, and so forth. In some embodiments the user interface 204 can be used to select which image values are shown in the histogram 212 so that the user can, for example, toggle between luminance and any one of the individual color channels, or any combination of image values.

It will also be appreciated that the histogram 212 can be scaled in any of a number of different ways. For example, the histogram 212 can be autoscaled so that a range for the Y-axis of histogram 212 has a maximum equal to the number of stored pixels 226 in a most populated bin and a minimum equal to the number of stored pixels 226 in a least populated bin. Alternately, the maximum and minimum for the Y-axis range can be fixed values. In some embodiments those fixed values are equal to the number of stored pixels 226 in the most and least populated bins when the entire captured image 208 is considered in place of the reduced portion 228. In some embodiments, the Y-axis maps a nonlinear function of the number of counted pixels, for example a cube-root or an approximately logarithmic function. Here, too, the user interface 204 in some embodiments can allow the user to switch between different scales for the Y-axis. Likewise, the X-axis of the histogram 212 can also be scaled in different ways. For example, the X-axis can be scaled to the entire range for an image value, or a user selected segment of the range to allow the user to examine, for example, just an end of the range.

Further, image values can be represented in different ways within the histogram 212. One way to represent an image value is with a solid line as shown in FIGS. 2–5. Another way to represent an image value is to additionally shade the area beneath the line. In some embodiments the way image values are represented depends on the number of image values that are being displayed. Other graphical representations, such as bar graphs, can also be implemented.

Additionally, the display of the histogram 212 can be implemented in numerous ways. As shown in FIGS. 3 and 5 the histogram 212 can be displayed on the display device 202 adjacent to the area of interest 214. Similarly, as shown in FIG. 4, the histogram 212 can be displayed on the display device 202 adjacent to the displayed image 208 where the displayed image 208 includes the user selected reduced window 220 around the area of interest 214. In other embodiments the histogram 212 is superimposed over the area of interest 214, where the area of interest 214 either fills the entire area of the display device 202 or a window of the display device 202 such as the window illustrated in FIGS. 3 and 5. In some embodiments in which the histogram 212 and the area of interest 214 are both displayed simultaneously on the display device 202, as the area of interest 214 is changed the histogram 212 is refreshed. Thus, as the user zooms and pans with the user interface 204, for example, the processing electronics 222 continuously update the histogram 212.

In still other embodiments the user can employ the user interface 204 to toggle between viewing either the histogram 212 or the area of interest 214 on the display device 202. In yet other embodiments the user can toggle between a first mode in which the stored digital image 208 fills the entire area of the display device 202 and a second mode in which the histogram 212 is displayed on the display device 202 adjacent to the area of interest 214. In some of these embodiments the area of interest 214 can be selected in the first mode, for example, by panning and zooming with the user interface 204. In still other embodiments various image information can be displayed adjacent to both the histogram 212 and the area of interest 214 in the second mode. Other modes with other permutations are also envisioned, such as a mode in which the image information and the histogram 212 are displayed without the area of interest 214, and a mode in which the area of interest 214 and the image information are displayed without the histogram 212.

Further embodiments of the invention allow a user to prospectively evaluate how an image is likely to turn out if acquired. These embodiments can be useful when the digital camera is in the viewfinder mode, for example. In some of these embodiments the sensor 110 (FIG. 1) is repeatedly scanned to create a periodically refreshed real-time image on the display device 202. Each scan of the sensor 110 can produce a frame of the real-time image. Each frame can be stored as a number of pixels in a memory device 224, such as a volatile frame buffer. Accordingly, each frame can serve as a captured image 225. A reduced portion 228 can be selected, for example, by zooming and panning to define an area of interest 214 or by drawing a reduced window 220 (FIG. 4). A histogram 212 can then be derived from the reduced portion 228. In some embodiments, each time the frame buffer is refreshed with a new frame, the histogram 212 is derived again from the reduced portion.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method for providing a zoomed histogram display on a digital camera, comprising:
reading a captured image from a memory device and displaying it as a digital image on a display device of the digital camera including mapping a first number of stored pixels of the captured image to displayed pixels of the display device;
zooming the digital image until only an area of interest of the digital image is displayed;

deriving a histogram based on the area of interest; and
displaying the histogram.

2. The method of claim 1 wherein zooming the digital image includes mapping a second number of stored pixels of the captured image to the displayed pixels, the second number of stored pixels being less than the first number of stored pixels.

3. The method of claim 2 where each stored pixel of the second number of stored pixels includes a value within a range for an image value.

4. The method of claim 3 wherein deriving the histogram includes
   dividing the range into a number of bins so that each bin represents a part of the range, and
   counting for each bin the stored pixels of the second number of stored pixels that have values within the part of the range represented by that bin.

5. The method of claim 2 wherein the image value represents a level of a color channel.

6. The method of claim 2 wherein each stored pixel of the second number of stored pixels includes a value within a range for each of three color channels.

7. The method of claim 6 wherein deriving the histogram includes
   dividing the range for each of the three color channels into a number of bins so that each bin represents a part of that range, and
   counting for each bin of each color channel the stored pixels of the second number of stored pixels that have values within the part of the range represented by that bin.

8. The method of claim 6 wherein deriving the histogram includes
   calculating for each stored pixel of the second number of stored pixels a weighted combination of the values of the three color channels to determine a derived value within a derived range,
   dividing the derived range into a number of bins so that each bin represents a part of the derived range, and
   counting for each bin the stored pixels of the second number of stored pixels that have derived values within the part of the derived range represented by that bin.

9. The method of claim 8 wherein the derived value is a luminance value.

10. A method for providing a zoomed histogram display on a display device, comprising:
    reading a captured image from a memory device and displaying it as a digital image on the display device including mapping a first number of stored pixels of the captured image to displayed pixels of the display device;
    zooming the digital image until only an area of interest of the digital image is displayed;
    deriving a histogram based on the area of interest; and
    displaying the histogram.

11. The method of claim 10 wherein zooming the digital image includes mapping a second number of stored pixels of the captured image to the displayed pixels, the second number of stored pixels being less than the first number of stored pixels.

12. The method of claim 10 where each stored pixel of the second number of stored pixels includes a value within a range for an image value.

13. The method of claim 12 wherein deriving the histogram includes
    dividing the range into a number of bins so that each bin represents a part of the range, and
    counting for each bin the stored pixels of the second number of stored pixels that have values within the part of the range represented by that bin.

14. The method of claim 10 wherein the image value represents a level of a color channel.

15. The method of claim 10 wherein each stored pixel of the second number of stored pixels includes a value within a range for each of three color channels.

16. The method of claim 15 wherein deriving the histogram includes
    dividing the range for each of the three color channels into a number of bins so that each bin represents a part of that range, and
    counting for each bin of each color channel the stored pixels of the second number of stored pixels that have values within the part of the range represented by that bin.

17. The method of claim 15 wherein deriving the histogram includes
    calculating for each stored pixel of the second number of stored pixels a weighted combination of the values of the three color channels to determine a derived value within a derived range,
    dividing the derived range into a number of bins so that each bin represents a part of the derived range, and
    counting for each bin the stored pixels of the second number of stored pixels that have derived values within the part of the derived range represented by that bin.

18. The method of claim 17 wherein the derived value is a luminance value.

* * * * *